US010218906B2

(12) United States Patent
Yu et al.

(10) Patent No.: US 10,218,906 B2
(45) Date of Patent: Feb. 26, 2019

(54) CAMERA DEVICE AND METHOD FOR CAMERA DEVICE

(71) Applicant: HTC Corporation, Taoyuan (TW)

(72) Inventors: Wen-Hsiang Yu, Taoyuan (TW); Chun-Wei Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/466,857

(22) Filed: Mar. 22, 2017

(65) Prior Publication Data
US 2018/0278821 A1   Sep. 27, 2018

(51) Int. Cl.
H04N 5/232 (2006.01)
H04N 5/235 (2006.01)
H04N 1/60 (2006.01)
H04N 9/73 (2006.01)

(52) U.S. Cl.
CPC ......... H04N 5/23245 (2013.01); H04N 1/60 (2013.01); H04N 5/2352 (2013.01); H04N 5/2353 (2013.01); H04N 5/23212 (2013.01); H04N 5/23222 (2013.01); H04N 5/23258 (2013.01); H04N 5/23287 (2013.01); H04N 9/735 (2013.01); H04N 2201/0084 (2013.01)

(58) Field of Classification Search
CPC .. H04N 5/23222; H04N 5/235; H04N 5/2352; H04N 5/2353; H04N 5/238; H04N 5/243; G02B 27/646
See application file for complete search history.

(56) References Cited

U.S. PATENT DOCUMENTS

| 2006/0170816 A1* | 8/2006 | Silverstein ........... H04N 5/2352 348/362 |
| 2010/0194897 A1* | 8/2010 | Yumiki ................. G03B 7/091 348/208.4 |
| 2012/0321132 A1* | 12/2012 | Ohta ................... H04N 5/23296 382/103 |
| 2013/0242120 A1* | 9/2013 | Venkatraman ......... H04N 5/225 348/208.4 |
| 2014/0036101 A1 | 2/2014 | Forbes et al. |
| 2015/0256756 A1 | 9/2015 | Sakurai |
| 2016/0112640 A1 | 4/2016 | Hasan et al. |
| 2016/0156846 A1* | 6/2016 | Wang ................. H04N 5/23245 348/207.99 |
| 2017/0034432 A1 | 2/2017 | Lou et al. |
| 2017/0048460 A1* | 2/2017 | Lee .................... H04N 5/23245 |
| 2017/0085796 A1* | 3/2017 | Rangam ............. H04N 5/23245 |
| 2017/0187960 A1* | 6/2017 | Tsuchiya ............ H04N 5/23258 |

OTHER PUBLICATIONS

Corresponding Taiwan office action dated May 15, 2018.

* cited by examiner

Primary Examiner — Paul M Berardesca
(74) Attorney, Agent, or Firm — CKC & Partners Co., Ltd.

(57) ABSTRACT

A method applied to a camera device includes receiving one or all of an angular velocity signal and an acceleration signal, selecting one of predetermined motion modes according to the one or all of the angular velocity signal and the acceleration signal, configuring one or more of an exposure time of a camera, an auto focus (AF) configuration of the camera, an auto white balance (AWB) configuration of the camera, and an auto exposure (AE) configuration of the camera according to the selected motion mode, and capturing an image or recording a video according to the one or more of the exposure time of the camera, the AF configuration of the camera, the AWB configuration of the camera, and the AE configuration of the camera.

20 Claims, 9 Drawing Sheets

CAMERA DEVICE AND METHOD FOR CAMERA DEVICE

BACKGROUND

Technical Field

The present disclosure relates to an electronic device and a method. More particularly, the present disclosure relates to a camera device and a method for a camera device.

Description of Related Art

With advances in electronic technology, camera devices, such as smart phones and tablet computers, are being increasingly used.

A camera device may include a camera. The camera device may automatically configure the parameters of the camera according to the environmental conditions. For example, the camera device may increase the exposure time when the environmental light is weak, so as to acquire a brighter image.

SUMMARY

One aspect of the present disclosure related to a method. In accordance with one embodiment of the present disclosure, the method is applied to a camera device. The method includes receiving one or all of an angular velocity signal and an acceleration signal, selecting one of predetermined motion modes according to the one or all of the angular velocity signal and the acceleration signal, configuring one or more of an exposure time of a camera, an auto focus (AF) configuration of the camera, an auto white balance (AWB) configuration of the camera, and an auto exposure (AE) configuration of the camera according to the selected motion mode, and capturing an image or recording a video according to the one or more of the exposure time of the camera, the AF configuration of the camera, the AWB configuration of the camera, and the AE configuration of the camera.

Another aspect of the present disclosure is related to a camera device. In accordance with one embodiment of the present disclosure, the camera device includes a camera, one or more processing components, a memory, and one or more programs. The one or more processing components are electrically connected to the camera. The memory is electrically connected to the one or more processing components. The one or more programs are stored in the memory and configured to be executed by the one or more processing components. The one or more programs include instructions for receiving one or all of an angular velocity signal and an acceleration signal, selecting one of predetermined motion modes according to the one or all of the angular velocity signal and the acceleration signal, configuring one or more of an exposure time of a camera, an auto focus (AF) configuration of the camera, an auto white balance (AWB) configuration of the camera, and an auto exposure (AE) configuration of the camera according to the selected motion mode, and capturing an image or recording a video according to the one or more of the exposure time of the camera, the AF configuration of the camera, the AWB configuration of the camera, and the AE configuration of the camera.

Another aspect of the present disclosure is related to a camera device. In accordance with one embodiment of the present disclosure, the camera device includes a camera, one or more processing components, a memory, and one or more programs. The one or more processing components are electrically connected to the camera. The memory is electrically connected to the one or more processing components. The one or more programs are stored in the memory and configured to be executed by the one or more processing components. The one or more programs include instructions for receiving one or all of an angular velocity signal and an acceleration signal, configuring one or more of an exposure time of a camera and a gain of the camera according to an accuracy of an optical image stabilization (OIS) compensation, and capturing an image or recording a video according to the exposure time of the camera and the gain of the camera.

Through the operations of one embodiment described above, the image or the video can be captured or recorded corresponding to the selected motion mode of the camera device, so that the quality of the image or the video can be increased.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
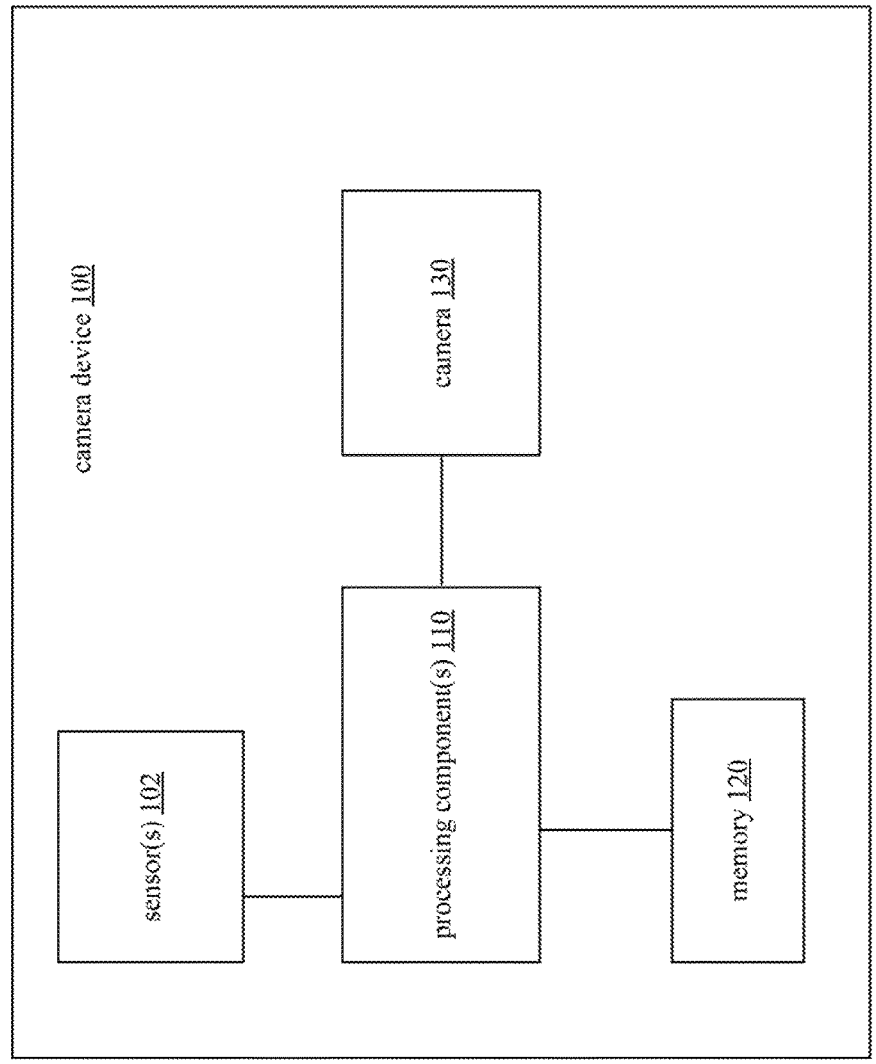
FIG. 1 is a schematic block diagram of a camera device in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, in the description herein and throughout the claims that follow, "around," "about," "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures or operations. Numerical quantities given herein are approximate, meaning that the term "around," "about," "approximately" or "substantially" can be inferred if not expressly stated, or meaning other approximate values.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

One aspect of the present disclosure is related to a camera device. In the paragraphs below, a smart phone will be taken as an example to describe details of the camera device. However, another camera device, such as a tablet computer or a camera, is within the contemplated scope of the present disclosure.

FIG. 1 is a schematic block diagram of a camera device 100 in accordance with one embodiment of the present disclosure. In this embodiment, the camera device 100 includes one or more sensors 102, one or more processing components 110, a memory 120, and a camera 130. In this embodiment, the one or more processing components 110 are electrically connected to the sensors 102, the memory 120, and the camera 130.

In one embodiment, the one or more sensors 102 may be realized by, for example, one or more gyro sensors, one or more angular velocity sensors, or an assembly of one or more angular velocity sensors and one or more acceleration sensors, but is not limited in this regard. In one embodiment, the one or more processing components 110 can be realized by, for example, one or more processors, such as central processors, digital signal processors (DSPs), image signal processors (ISPs) and/or microprocessors, but are not limited in this regard. In one embodiment, the memory 120 includes one or more memory devices, each of which comprises, or a plurality of which collectively comprise a computer readable storage medium. The memory 120 may include a read-only memory (ROM), a flash memory, a floppy disk, a hard disk, an optical disc, a flash drive, a tape, a database accessible from a network, or any storage medium with the same functionality that can be contemplated by persons of ordinary skill in the art to which this invention pertains.

In one embodiment, the one or more processing components 110 may run or execute various software programs and/or sets of instructions stored in the memory 120 to perform various functions for the camera device 100 and to process data.

In one embodiment, the sensors 102 may be disposed on the camera device 100. In one embodiment, the sensors 102 may be configured to detect an angular velocity of the camera device 100 and/or an acceleration of the camera device 100 and accordingly generate an angular velocity signal and/or an acceleration signal, respectively.

In one embodiment, there may be a plurality of predetermined motion modes, such as a tripod mode, a still mode, a walk mode, and a rotate mode.

In one embodiment, the one or more processing components 110 may select one of predetermined motion modes according to the one or all the angular velocity signal and the acceleration signal. For example under a condition that the magnitudes of the one or all of the angular velocity signal and the acceleration signal are lower than one or more predetermined thresholds, the one or more processing components 110 may select the tripod mode.

Subsequently, the one or more processing components 110 may configure one or more of an exposure time of the camera 130, an auto focus (AF) configuration of the camera 130, an auto white balance (AWB) configuration of the camera 130, and an auto exposure (AE) configuration of the camera 130 according to the selected motion mode. For example, under a case that the tripod mode is selected and the camera 130 is in a photo mode, the exposure time of the camera 130 can be long, and/or the AF response speed of the camera 130 can be fast. Under a case that the tripod mode is selected and the camera 130 is in a camera mode, the AF response speed of the camera 130, and/or the AWB response speed of the camera 130 can be fast, and/or the exposure time of the camera 130 in the AE configuration can be long.

Subsequently, the one or more processing components 110 can capture an image or record a video according to the one or more of the exposure time of the camera 130, the AF configuration of the camera 130, the AWB configuration of the camera 130, and/or the AE configuration of the camera 130.

Through the operations of one embodiment described above, the image or the video can be captured or recorded corresponding to a current motion mode of the camera device 130, so that the quality of the image or the video can be increased.

Details of the present disclosure are described in the paragraphs below with reference to an operating method in FIG. 2. However, the present disclosure is not limited to the embodiment below.

It should be noted that the operating method can be applied to a camera device having a structure that is the same as or similar to the structure of the camera device 100 shown in FIG. 1. To simplify the description below, the embodiment shown in FIG. 1 will be used as an example to describe the operating method according to an embodiment of the present disclosure. However, the present disclosure is not limited to application to the embodiment shown in FIG. 1.

Figure 2:
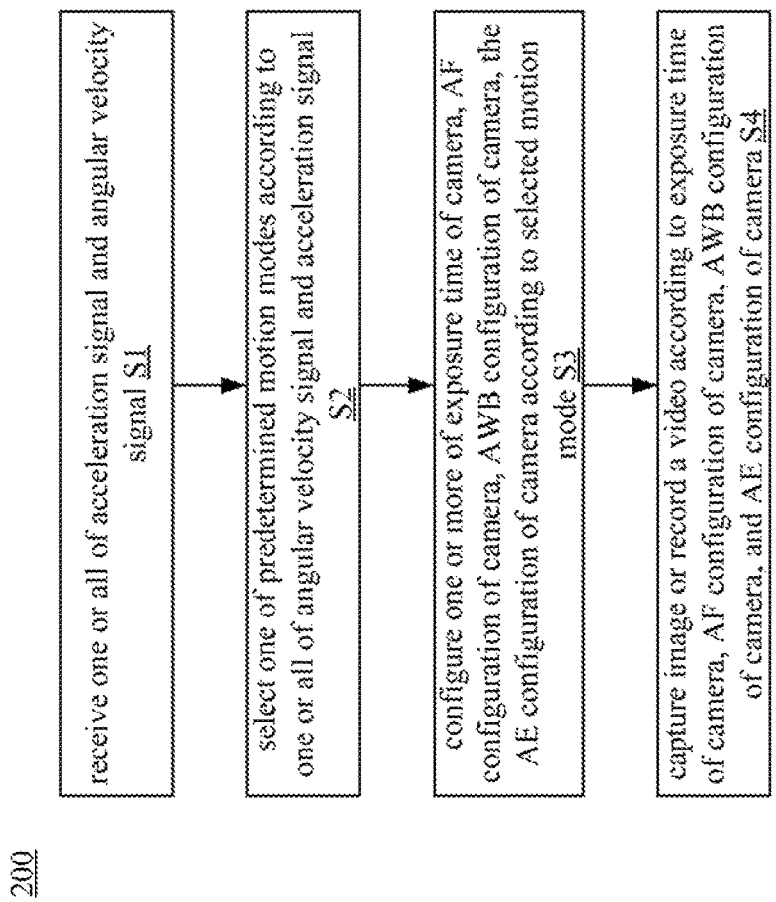
FIG. 2 is a flowchart of an operating method in accordance with one embodiment of the present disclosure.

Reference is made to FIGS. 1 and 2. The operating method 200 includes the operations as set forth below.

In operation S1, the one or more processing components 110 receive one or all of an acceleration signal and an angular velocity signal. In one embodiment, the one or all of the acceleration signal and the angular velocity signal are generated by the sensor 102. In one embodiment, the one or all of the acceleration signal and the angular velocity signal correspond to the acceleration and/or the angular velocity of the camera device 100.

In operation S2, the one or more processing components 110 select one of the predetermined motion modes according to the one or all of the angular velocity signal and the acceleration signal.

In one embodiment, the one or more processing components 110 may select one of the predetermined motion modes according to the magnitudes and/or the positivities of the one or all of the angular velocity and the acceleration signal.

For example, when the magnitudes of one or more of the vectors in the angular velocity signal are non-zero, and the one or more of the vectors in the angular velocity signal are maintained having a positive value or a negative value for a predetermined period, this may indicate rotation of the camera device 100, and the one or more processing components 110 may select the rotate mode.

In one embodiment, the one or more processing components 110 may acquire an image distance of the camera 130. In one embodiment, the image distance may indicate a distance between the lens and the image sensor of the camera 130. Subsequently, the one or more processing components 110 may calculate an image shake magnitude according to the image distance and the one or all of the angular velocity signal and the acceleration signal. Subsequently, the one or more processing components 110 may select one of the predetermined motion modes according to the image shake magnitude. In one embodiment, the image shake magnitude indicates a magnitude of a shake of an image captured by the camera 130 corresponding to the one or all of the angular velocity signal and the acceleration signal. For example, the image shake magnitude may be 1.5 mm on x-axis and/or 0.8 mm on y-axis.

In addition, in one embodiment, the one or more processing components 110 may determine a way of a shaking of the camera device 130 according to the one or all of the angular veracity signal and the acceleration signal. Subsequently, the one or more processing components 110 may select one of the predetermined motion modes according to the way of the shaking of the camera device 130. In one embodiment, the way of the shaking of the camera device 130 may be a shaking with a high or low frequency, or a shaking with the camera device 130 being continuously rotated.

In one embodiment, the one or more processing components 110 may select one of the predetermined motion modes according to both of the image shake magnitude and the way of the shaking of the camera device 130.

In operation S3, the one or more processing components 110 configure one or more of the exposure time of the camera 130, the AF configuration of the camera 130, the AWB configuration of the camera 130, and the AE configuration of the camera 130 according to the selected motion mode.

In operation S4, the one or more processing components 110 capture an image or record a video according to the exposure time of the camera 130, the AF configuration of the camera 130, the AWB configuration of the camera 130, and the AE configuration of the camera 130.

Through the operations of one embodiment described above, the image or the video can be captured or recorded corresponding to a current motion mode of the camera device 130, so that the quality of the image or the video can be increased.

Figure 3:
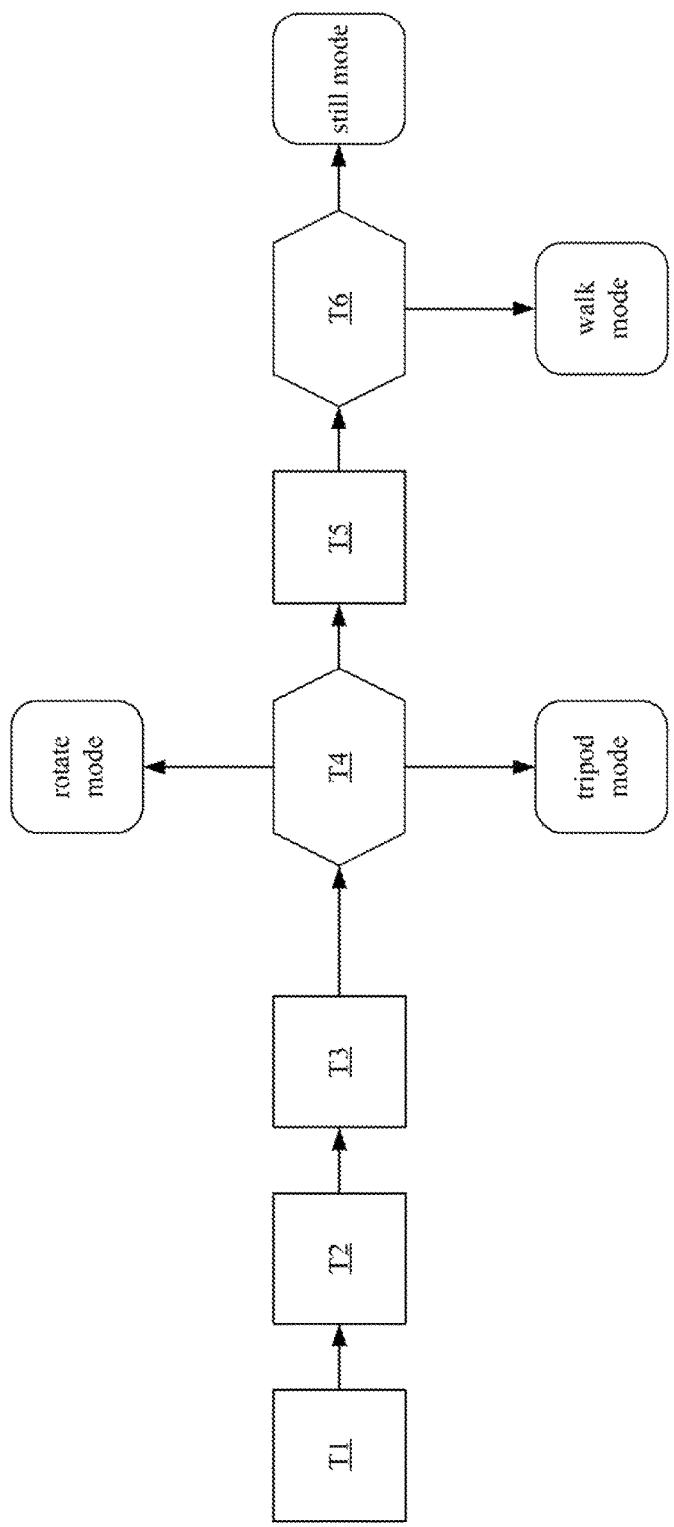
FIG. 3 shows an illustrative example in accordance with one embodiment of the present disclosure.

To allow the disclosure to be more fully understood, an illustrative example is described with reference to FIG. 3, but the present disclosure is not limited to the example below.

In operation T1, the sensors 102 detect an angular velocity of the camera device 100 and accordingly genera an angular velocity signal.

In operation T2, the one or more processing components 110 perform a static offset cancellation for the angular velocity signal. In one embodiment, this operation can be selectively omitted.

In operation T3, the one or more processing components 110 perform a dynamic offset cancellation for the angular velocity signal. In one embodiment, the dynamic offset cancellation can be performed by using a high-pass filter. In one embodiment, thermal noises of the angular velocity signal can be filtered out in this operation. In one embodiment, this operation can be selectively omitted.

In operation T4, the one or more processing components 110 determine whether to select the rotate mode or the tripod mode according to the angular velocity signal.

In one embodiment, under a case that the magnitudes of one or more of the vectors in the angular velocity signal are non-zero, and the one or more of the vectors in the angular velocity signal are maintained having a positive value or a negative value for a predetermined period (e.g., 2 seconds), this may indicate rotation of the camera device 100, and the one or more processing components 110 may select the rotate mode.

In one embodiment, under a case that the magnitudes of one or more of the vectors in the angular velocity signal are lower than one or more predetermined thresholds, the one or more processing components 110 may select the tripod mode. For example, when all of the vectors in the angular velocity signal are lower than 0.2 degrees per second, or a value calculated by the vectors (e.g., a root mean square or a summation of the magnitudes of the vectors) is lower than 0.5 degrees per second, the one or more processing components 110 may select the tripod mode. It should be noted that the values given above are for illustrative purposes, and other values are within the contemplated scope of the present disclosure.

In operation T5, under a case that neither does the rotate mode nor the tripod mode get selected, the one or more processing components 110 low-pass filter the angular velocity signal by using a low-pass filter. In one embodiment, high frequency noises of the angular velocity signal can be filtered out in this operation. In one embodiment, this operation can be selectively omitted.

In operation T6, under a case that neither does the rotate mode nor the tripod mode get selected, the one or more processing components 110 determine to select the still mode or the walk mode according to the angular velocity signal.

In one embodiment, if the magnitudes of one or more of the vectors in the angular velocity signal are lower than one or more predetermined thresholds, the one or more processing components 110 may select the still mode. If not, the one or more processing components 110 may select the walk mode.

For example, when all of the vectors in the angular velocity signal are lower than 0.5 degrees per second, or a value calculated by the vectors (e.g., a root mean square or a summation of the magnitudes of the vectors) is lower than 1 degree per second, the one or more processing components 110 may select the still mode. When one of the vectors in the angular velocity signal is greater than or equal to 0.5 degrees per second, or a value calculated by the vectors (e.g., a root mean square or a summation of the magnitudes of the vectors) is greater than or equal to 1 degree per second, the one or more processing components 110 may select the walk mode. It should be noted that the values given above are for illustrative purposes, and other values are within the contemplated scope of the present disclosure.

After the motion mode is selected, the one or more processing components 110 configure or adjust one or more of the exposure time of the camera 130, the AF configuration of the camera 130, the AWB configuration of the camera 130, and the AE configuration of the camera 130 according to the selected motion mode.

For example, table TB1 illustrates configurations corresponding to different motion modes in the photo mode.

TABLE TB1

|  | tripod mode | still mode | walk mode | rotate mode |
| --- | --- | --- | --- | --- |
| exposure time | long | medium | short | short |
| AF configuration | fast response | fast response | medium response | slow response |

The one or more processing components 110 may tend to configure the exposure time of the camera 130 with a long value under the tripod mode, a medium value under the still mode, and a short value under the walk mode or the rotate mode.

In addition, the one or more processing components 110 may tend to configure the AF speed of the camera 130 with a fast value (e.g., configure the AF response time of the camera 130 with a short value) under the tripod mode or the still mode, a medium value (e.g., configure the AF response time of the camera 130 with a medium value) under the walk mode, and a slow value (e.g., configure the AF response time of the camera 130 with a long value) under the rotate mode.

After the parameters of the camera 130 are configured or adjusted, the one or ore processing components 110 can capture an image according to these parameters.

In another example, table TB2 illustrates configurations corresponding to different motion modes in the camera mode.

TABLE TB2

|  | tripod mode | still mode | walk mode | rotate mode |
| --- | --- | --- | --- | --- |
| AF & AWB configuration | fast response | fast response | medium response | slow response |
| AE configuration | long exposure | long exposure | short exposure | short exposure |

The one or more processing components 110 may tend to configure the AF and/or AWB speed of the camera 130 with a fast value (e.g., configure the AF and/or AWB response time of the camera 130 with a short value) under the tripod mode or the still mode, to configure the AF and/or AWB speed of the camera 130 with a medium value (e.g., configure the AF and/or AWB response time of the camera 130 with a medium value) under the walk mode, and to configure the AF and/or AWB speed of the camera 130 with a slow value (e.g., configure the AF and/or AWB response time of the camera 130 with a long value) under the rotate mode.

In addition, the one or more processing components 110 may tend to configure the AE configuration of the camera 130 with a long exposure time under the tripod mode or the still mode, and to configure the AE configuration of the camera 130 with a short exposure time under the walk mode or the rotate mode.

In some embodiments, the camera 100 may perform an optical image stabilization (OIS) compensation to align an optical axis of the camera 130 to compensate for an excursion caused by shaking of a user's hand. In these embodiments, the OIS component may align the optical axis of the camera 130 by moving one or more of the camera 130, an image sensor of the camera 130, and a lens of the camera 130 corresponding to the excursion.

In some embodiments, the degree of the alignment can be decreased to avoid the jello effect. For example, when a target compensation value to compensate for an excursion caused by shaking of a user's hand is 2 degrees, the camera 100 may perform the OIS compensation with a decreased compensation value (e.g., 1.5 degrees).

In some embodiments, the decrement of the alignment may be configured corresponding to the selected motion mode.

For example, table TB3 illustrates configurations of the decrement of the alignment in OIS compensation corresponding to different motion modes in the camera mode.

TABLE TB3

|  | tripod mode | still mode | walk mode | rotate mode |
| --- | --- | --- | --- | --- |
| decrement of alignment in OIS compensation | weak decrement | weak decrement | medium decrement | strong decrement |

The one or more processing components 110 may tend to configure the alignment in OIS compensation with a slight decrement under the tripod mode and the still mode, to configure the alignment in OIS compensation with a medium decrement under the walk mode, and to configure the alignment in OIS compensation with a strong decrement under the rotate mode.

After the parameters of the camera 130 are configured or adjusted, the one or more processing components 110 can record a video according to these parameters.

Figure 4:
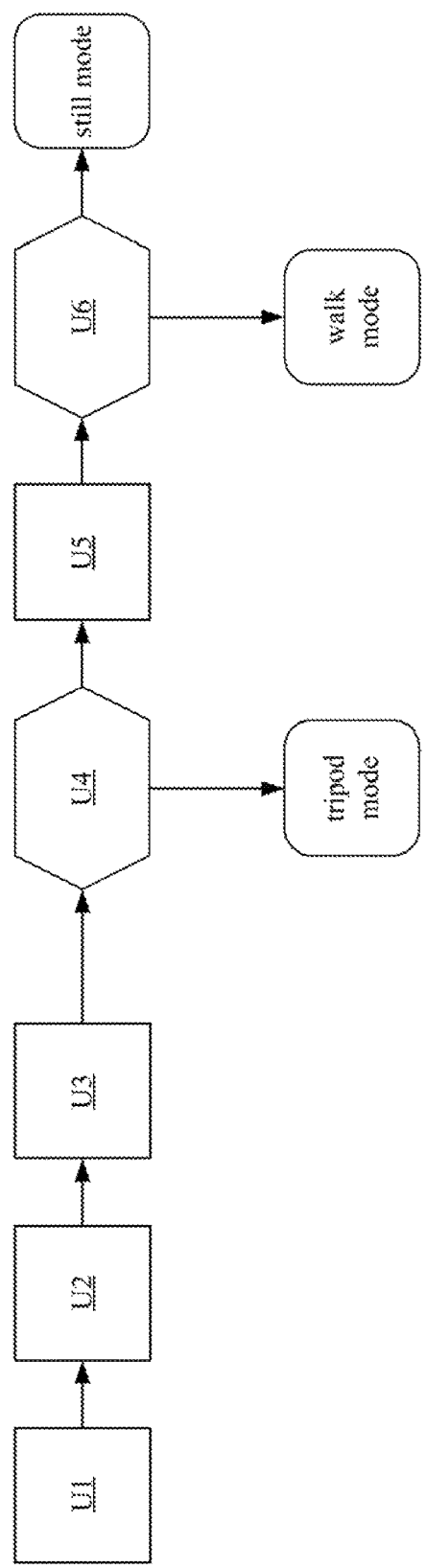
FIG. 4 shows an illustrative example in accordance with another embodiment of the present disclosure.

Another illustrative example is described with reference to FIG. 4, but the present disclosure is not limited to the example below.

In operation U1, the sensors 102 detect an acceleration of the camera device 100 and accordingly generate an acceleration signal.

In operation U2, the one or more processing components 110 perform a static offset cancellation for the acceleration signal. In one embodiment, this operation can be selectively omitted.

In operation U3, the one or more processing components 110 perform a dynamic offset cancellation for the acceleration signal. In one embodiment, the dynamic offset cancellation can be performed by using a high-pass filter. In one embodiment, thermal noises of the acceleration signal can be filtered out in this operation. In one embodiment, this operation can be selectively omitted.

In operation U4, the one or more processing components 110 determine whether to select the tripod mode according to the acceleration signal.

In one embodiment, under a case that the magnitudes of one or more of the vectors in the acceleration signal are lower than one or more predetermined thresholds, the one or more processing components 110 may select the tripod mode. For example, when all of the vectors in the acceleration signal are lower than 0.2 mm/s$^2$, or a value calculated by the vectors (e.g., a root mean square or a summation of the magnitudes of the vectors) is lower than 0.5 mm/s$^2$, the one or more processing components 110 may select the tripod mode. It should be noted that the values given above are for illustrative purposes, and other values are within the contemplated scope of the present disclosure.

In operation U5, under a case that the tripod mode does not get selected, the one or more processing components 110 low-pass filter the acceleration signal by using a low-pass filter. In one embodiment, high frequency noises of the acceleration signal can be filtered out in this operation. In one embodiment, this operation can be selectively omitted.

In operation U6, under a case that the tripod mode does not get selected, the one or more processing components 110 determine to select the still mode or the walk mode according to the acceleration signal.

In one embodiment, if the magnitudes of one or more of the vectors in the acceleration signal are lower than one or more predetermined thresholds, the one or more processing components 110 may select the still mode. If not, the one or more processing components 110 may select the walk mode.

For example, when all of the vectors in the acceleration signal are lower than 0.5 mm/s$^2$, or a value calculated by the vectors (e.g., a root mean square or a summation of the magnitudes of the vectors) is lower than 1 mm/s$^2$, the one or more processing components 110 may select the still mode. When one of the vectors in the acceleration signal is greater than or equal to 0.5 mm/s$^2$, or a value calculated by the vectors (e.g., a root mean square or a summation of the magnitudes of the vectors) is greater than or equal to 1 mm/s$^2$, the one or more processing components 110 may select the walk mode. It should be noted that the values given above are for illustrative purposes, and other values are within the contemplated scope of the present disclosure.

After the motion mode is selected, the one or more processing components 110 configure or adjust one or more of the exposure time of the camera 130, the AF configuration of the camera 130, the AWB configuration of the camera 130, and the AE configuration of the camera 130 according to the selected motion mode Details of this operation can be ascertained with reference to the paragraphs above, and a description in this regard will not be repeated herein.

Figure 5:
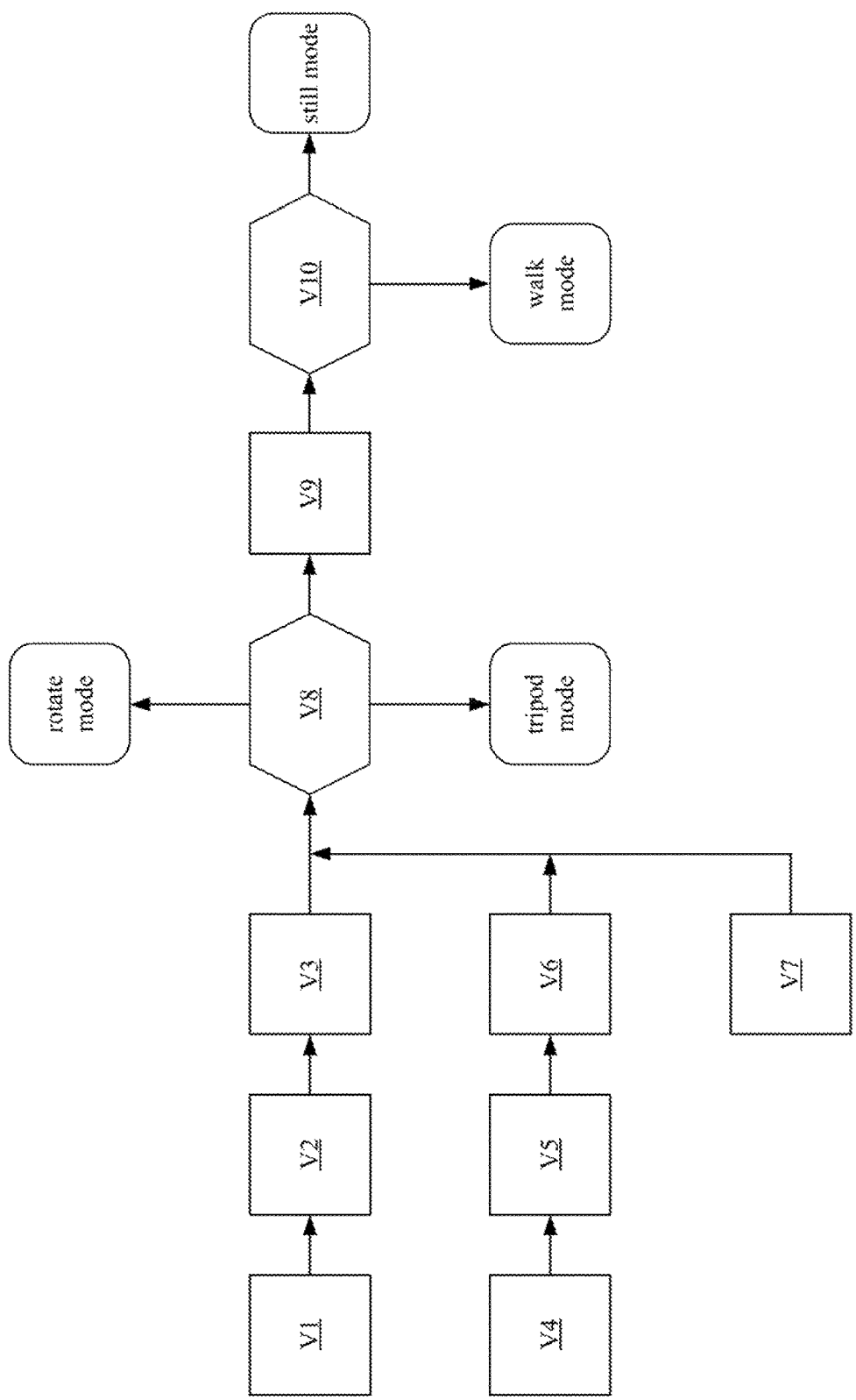
FIG. 5 shows an illustrative example in accordance with another embodiment of the present disclosure.

Another illustrative example is described with reference to FIG. 5, but the present disclosure is not limited to the example below.

In this illustrative example, operations V1-V3 are similar to operations T1-T3 described above, operations V4-V6 are similar to operations U1-U3 described above, and a description in this regard will not be repeated herein.

In operation V7, the one or more processing components 110 acquire an image distance of the camera 130. Details of this operation can be ascertained with reference to the paragraphs described above, and a description in this regard will not be repeated herein. In one embodiment, this operation can be selectively omitted.

In operation V8, the one or more processing components 110 determine whether to select the tripod mode or the rotate mode according to the angular velocity signal, the acceleration signal, and/or the image distance of the camera 130.

In one embodiment, the one or more processing components 110 may calculate an image shake magnitude related to the angular velocity of the camera device 100 according to the angular velocity signal and the image distance of the camera 130. In one embodiment, the one or more processing components 110 may calculate an image shake magnitude related to the acceleration of the camera device 100 according to the acceleration signal and the image distance of the camera 130. Subsequently, the one or more processing components 110 determine whether to select the rotate mode or the tripod mode according to the image shake magnitude related to the angular velocity of the camera device 100 and/or the image shake magnitude related to the acceleration of the camera device 100.

In an alternative embodiment, the one or more processing components 110 may determine whether to select the rotate mode or the tripod mode according to the angular velocity signal and/or the acceleration signal instead of the image shake magnitude.

In one embodiment, under a case that the magnitudes of one or more of the vectors in the angular velocity signal are non-zero, and the one or more of the vectors in the angular velocity signal are maintained having a positive value or a negative value for a predetermined period (e.g., 2 seconds), this may indicate rotation of the camera device 100, and the one or more processing components 110 may select the rotate mode.

In one embodiment, under a case that the magnitudes of one or more of the vectors in the angular velocity signal and the acceleration signal are lower than one or more predetermined thresholds, the one or more processing components 110 may select the tripod mode. For example, when all of the vectors in the angular velocity signal are lower than 0.2 degrees per second and all of the vectors in the acceleration signal are lower than 0.2 mm/s$^2$, or a value calculated by the vectors in the angular velocity signal (e.g., a root mean square or a summation of the magnitudes of the vectors) is lower than 0.5 degrees per second and a value calculated by the vectors (e.g., a root mean square or a summation of the magnitudes of the vectors) is lower than 0.5 mm/s$^2$, the one or more processing components 110 may select the tripod mode. It should be noted that the values given above are for illustrative purposes, and other values are within the contemplated scope of the present disclosure.

In operation V9, under a case that neither does the rotate mode nor the tripod mode get selected, the one or more processing components 110 low-pass filter the angular velocity signal and the acceleration signal by using low-pass filters. In one embodiment, high frequency noises of the angular velocity signal and the acceleration signal can be filtered out in this operation. In one embodiment, this operation can be selectively omitted.

In operation V10, under a case that does neither the rotate mode nor the tripod mode get selected, the one or more processing components 110 determine to select the still mode or the walk mode according to the angular velocity signal, the acceleration signal, and/or the image distance.

In one embodiment, the one or more processing components 110 determine to select the still mode or the walk mode according to the image shake magnitude elated to, the angular velocity of the camera device 100 and/or the image shake magnitude related to the acceleration of the camera device 100.

In an alternative embodiment, the one or more processing components 110 determine to select the still lode or the walk mode according to the angular velocity signal and/or the acceleration signal instead of the image shake magnitude.

In one embodiment, if the magnitudes of one or more of the vectors in the angular velocity signal and/or the acceleration signal are lower than one or more predetermined thresholds, the one or more processing components 110 may select the still mode. If not, the one or more processing components 110 may select the walk mode.

For example, when all of the vectors in the angular velocity signal are lower than 0.5 degrees per second and all of the vectors in the acceleration signal are lower than 0.5 $mm/s^2$, or a value calculated by the vectors in the angular velocity signal (e.g., a root mean square or a summation of the magnitudes of the vectors) is lower than 1 degree per second and a value calculated by the vectors (e.g., a root mean square or a summation of the magnitudes of the vectors) is lower than 1 $mm/s^2$, the one or more processing components 110 may select the still mode. When one of the vectors in the angular velocity signal is greater than or equal to 0.5 degrees per second, one of the vectors in the acceleration signal is greater than or equal to 0.5 $mm/s^2$, a value calculated by the vectors in the angular velocity signal (e.g., a root mean square or a summation of the magnitudes of the vectors) is greater than or equal to 1 degree per second, or a value calculated by the vectors (e.g., a root mean square or a summation of the magnitudes of the vectors) is greater than or equal to 1 $mm/s^2$, the one or more processing components 110 may select the walk mode. It should be noted that the values given above are for illustrative purposes, and other values are within the contemplated scope of the present disclosure.

After the motion mode is selected, the one or more processing components 110 configure or adjust one or more of the exposure time of the camera 130, the AF configuration of the camera 130, the AWB configuration of the camera 130, and the AE configuration of the camera 130 according to the selected motion mode. Details of this operation can be ascertained with reference to the paragraphs above, and a description in this regard will not be repeated herein.

Figure 6:
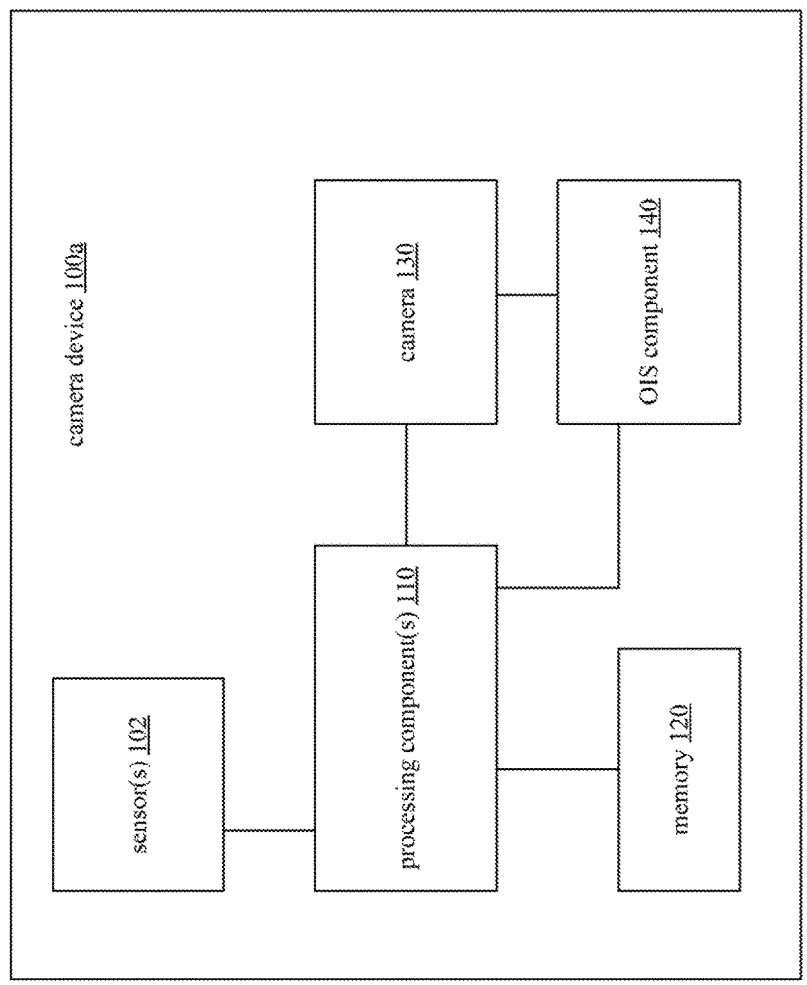
FIG. 6 is a schematic block diagram of a camera device in accordance with another embodiment of the present disclosure.

FIG. 6 is a schematic block diagram of a camera device 100*a* in accordance with one embodiment of the present disclosure. In this embodiment, the camera device 100 includes one or more sensors 102, one or more processing components 110, a memory 120, a camera 130, and an optical image stabilization (OIS) component 140. In this embodiment, the one or more processing components 110 are electrically connected to the sensors 102, the memory 120, and the camera 130. The OIS component 140 is electrically connected to the one or more processing components 110 and the camera 130.

The sensor 102, the one or more processing components 110, the memory 120, and the camera 130 in the camera device 100*a* are substantially identical to the sensor 102, the one or more processing components 110, the memory 120, and the camera 130 in the camera device 100 of the previous embodiment, and a description of many aspects that are similar will not be repeated. In one embodiment, the operations of the camera device 100 described above can also be executed by the camera device 100*a*.

In one embodiment, the OIS component 140 can be configured to execute an OIS compensation to align an optical axis of the camera 130 to compensate for an excursion caused by shaking of a user's hand. In one embodiment, the OIS component 140 may align the optical axis of the camera 130 by moving one or more of the camera 130, an image sensor of the camera 130, and a lens of the camera 130 corresponding to the excursion. In one embodiment, the OIS component 140 may align the optical axis of the camera 130 by using actuators of the OIS component 140.

In one embodiment, the one or more processing components 110 may determine an accuracy of the OIS compensation of the OIS component 140. Subsequently, the one or more processing components 110 can configure one or more of an exposure time of the camera 130 and a gain of the camera 130 according to the accuracy of the OIS compensation.

For example, when the accuracy of the OIS compensation of the OIS component 140 is high, this may indicate that the camera 130 can be stabilized in a satisfactory manner. Therefore, a longer exposure time of the camera 130 is possible, as is a lower gain of the camera 130. When the accuracy of the OIS compensation of the OIS component 140 is poor, this may indicate that the camera 130 can not be stabilized in a satisfactory manner. Therefore, the one or more processing components 110 can configure the exposure time of the camera 130 with a shorter value, and configure the gain of the camera 130 with a higher value, so as to increase the quality of the image or the video.

Subsequently, the one or more processing components 110 can capture an image or record a video according to one or more of the exposure time of the camera 130 and the gain of the camera 130.

Through the operations of one embodiment described above, the image or the video can be captured or recorded corresponding to the accuracy of the OIS compensation, so that the quality of the image or the video can be increased.

Details of the present disclosure are described in the paragraphs below with reference to an operating method in FIG. 7. However, the present disclosure is not limited to the embodiment below.

It should be noted that the operating method can be applied to a camera device having a structure that is the same as or similar to the structure of the camera device 100 shown in FIG. 6. To simplify the description below, the embodiment shown in FIG. 6 will be used as an example to describe the operating method according to an embodiment of the present disclosure. However, the present disclosure is not limited to application to the embodiment shown in FIG. 6.

Figure 7:
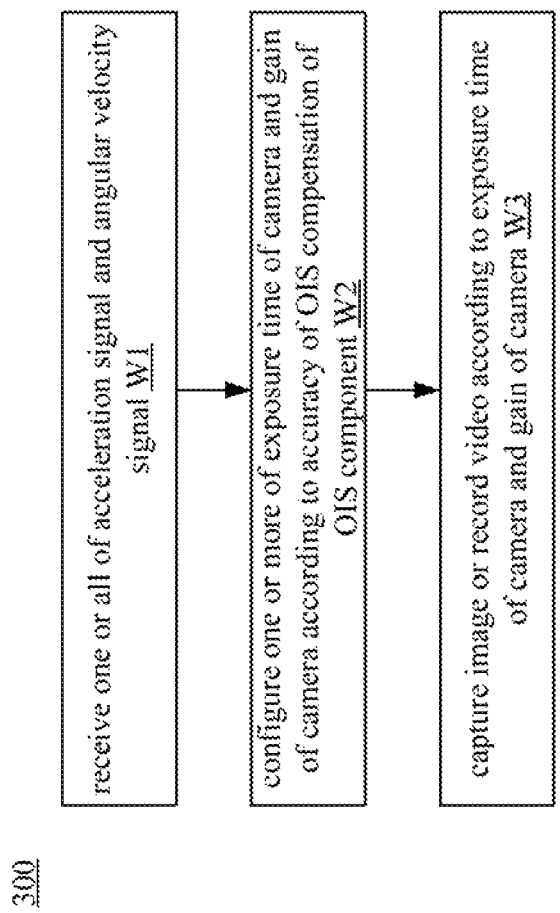
FIG. 7 is a flowchart of an operating method in accordance with another embodiment of the present disclosure.

Reference is made to FIGS. 6 and 7. The operating method 300 includes the operations as set forth below.

In operation W1, the one or more processing components 110 receive one or all of an acceleration signal and an angular velocity signal. In one embodiment, the one or all of the acceleration signal and the angular velocity signal are generated by the sensor 102. In one embodiment, the one or all of the acceleration signal and the angular velocity signal correspond to the acceleration and/or the angular velocity of the camera device 100.

In operation W2, the one or more processing components 110 configure one or more of an exposure time of the camera 130 and a gain of the camera 130 according to an accuracy of the OIS compensation of the OIS component 140.

In one embodiment, the one or more processing components 110 may calculate a target compensation value of the OIS compensation according to the one or all of the angular velocity signal and the acceleration signal. In one embodiment, the camera device 100 may execute the OIS compensation with the target compensation value corresponding to the one or all of the acceleration signal and the angular velocity signal.

Subsequently, in one embodiment, after the OIS compensation corresponding to the one or all of the angular velocity signal and the acceleration signal is executed, the one or more processing components 110 may acquire an actual compensation value in execution of the OIS compensation. In one embodiment, the one or more processing components 110 may use a location sensor to detect one or more locations of the camera 130, an image sensor of the camera 140, and a lens of the camera 130 in execution of the OIS compensation, and acquire the actual compensation value according to the one or more locations of the one or more of the camera 130, an image sensor of the camera 140, and the lens of the camera 130.

Subsequently, the one or more processing components 110 may determine the accuracy of the OIS compensation according to the target compensation value of the OIS compensation and the actual compensation value of the OIS compensation. For example, if a difference between the target compensation value of the OIS compensation and the actual compensation value of the OIS compensation is lower than a threshold, the accuracy of the OIS compensation is determined to be high. If not, the accuracy of the OIS compensation is determined to be poor.

In another embodiment, the one or more processing components 110 may determine the accuracy of the OIS compensation by using different cutoff frequencies.

In one embodiment, the one or more processing components 110 may high-pass filter the one or all of the angular velocity signal and the acceleration signal with a first cutoff frequency to generate a first filtered signal. Subsequently, the one or more processing components 110 may calculate a first target compensation value of the OIS compensation according to the first filtered signal. In one embodiment, the first target compensation value is used in the OIS compensation to compensate for an excursion of the camera device 100 corresponding to the first filtered signal.

In one embodiment, the one or more processing components 110 may high-pass filter the one or all of the angular velocity signal and the acceleration signal with a second cutoff frequency to generate a second filtered signal. In one embodiment, the second cutoff frequency is lower than the first cutoff frequency. Subsequently, the one or more processing components 110 may calculate a second target compensation value of the OIS compensation according to the second filtered signal. In one embodiment, the second target compensation value can be used in the OIS compensation corresponding to the second filtered signal.

In one embodiment, after both of the first target compensation value of the OIS compensation and second target compensation value of the OIS compensation are calculated, the one or more processing components 110 may determine the accuracy of the OIS compensation according to the first target compensation value of the OIS compensation and second target compensation value of the OIS compensation.

In one embodiment, if a difference between the first target compensation value of the OIS compensation and the second target compensation value of the OIS compensation is greater than a predetermined threshold, this may indicate that part of significant data in the one or all of the angular velocity signal and the acceleration signal are filtered out by the filter with the first cutoff frequency, and the OIS compensation with the first cutoff frequency is inaccurate. Therefore, the one or more processing components 110 may determine that the accuracy of the OIS compensation is poor.

On the other hand, if a difference between the first target compensation value of the OIS compensation and second target compensation value of the OIS compensation is lower than the predetermined threshold, this may indicate that most of significant data in the one or all of the angular velocity signal and the acceleration signal are retained in the first filtered signal, and the OIS compensation with the first cutoff frequency is accurate. Therefore, the one or more processing components 110 may determine that the accuracy of the OIS compensation is high.

In operation W3, the one or more processing components 110 capture an image or record a video according to the exposure time of the camera and the gain of the camera 130.

Through the operations of one embodiment described above, the image or the video can be captured or recorded corresponding to the accuracy of the OIS compensation, so that the quality of the image or the video can be increased.

Figure 8:
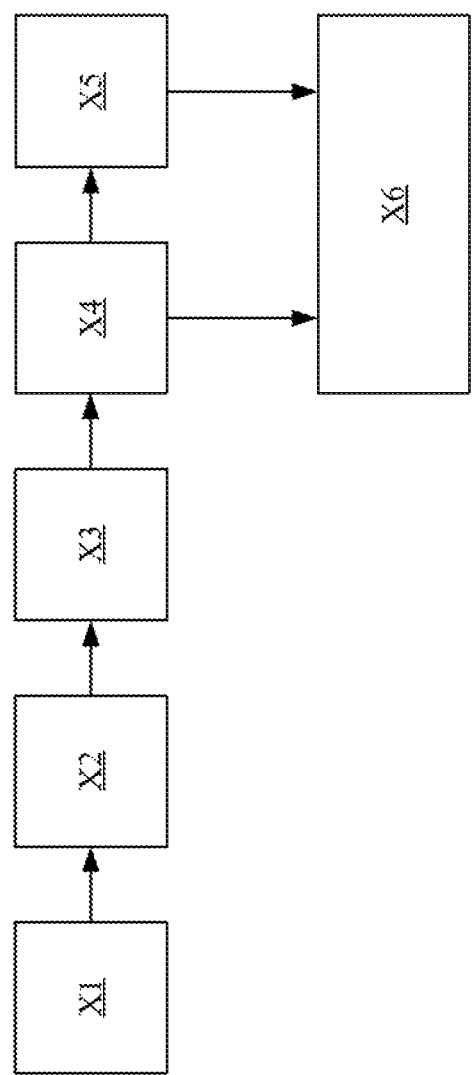
FIG. 8 shows an illustrative example in accordance with another embodiment of the present disclosure.

To allow the disclosure to be more fully understood, an illustrative example is described with reference to FIG. 8, but the present disclosure is not limited to the example below.

In operation X1, the sensors 102 detect an angular velocity and/or an acceleration of the camera device 100, and accordingly generate an angular velocity signal and/or an acceleration signal.

In operation X2, the one or more processing components 110 perform a static offset cancellation for the angular velocity signal and/or the acceleration signal. In one embodiment, this operation can be selectively omitted.

In operation X3, the one or more processing components 110 perform a dynamic offset cancellation for the angular velocity signal and/or the acceleration signal. In one embodiment, the dynamic offset cancellation can be performed by using a high-pass filter. In one embodiment, thermal noises of the angular velocity signal and/or the acceleration signal can be filtered out in this operation. In one embodiment, this cape ration can be selectively omitted.

In operation X4, the one or more processing components 110 may calculate a target compensation value of the OIS compensation according to the one or all of the angular velocity signal and the acceleration signal.

In operation X5, the one or more processing components 110 provide the target compensation value to the OIS component 140 to make the OIS component 140 execute the OIS compensation. Subsequently, the one or more processing components 110 acquire an actual compensation value in execution of the OIS compensation. Details in this regard can be ascertained with reference to the paragraphs above, and a description in this regard will not be repeated herein.

In operation X6, the one or more processing components 110 determine the accuracy of the OIS compensation according to the target compensation value of the OIS compensation and the actual compensation value of the OIS compensation. Details in this regard can be ascertained with reference to the paragraphs above, and a description in this regard will not be repeated herein.

After the accuracy of the OIS compensation is determined, the one or more processing components 110 configure or adjust one or more of the exposure time of the camera 130 and the gain of the camera 130 according to an accuracy of the OIS compensation of the OIS component 140.

For example, table TB4 illustrates configurations corresponding to different accuracies of the OIS compensation.

TABLE TB4

| accuracy of OIS compensation | exposure time | gain |
|---|---|---|
| high OIS compensation accuracy | long | low |
| poor OIS compensation accuracy | short | high |

The one or more processing components 110 may tend to configure the exposure time of the camera 130 with a longer value when the accuracy of the OIS compensation is high, and to configure the exposure time of the camera 130 with a shorter value when the accuracy of the OIS compensation is poor.

In addition, the one or more processing components 110 may tend to configure the gain of the camera 130 with a lower value when the accuracy of the OIS compensation is high, and to configure the gain of the camera 130 with a higher value when the accuracy of the OIS compensation is poor.

After the parameters of the camera 130 are configured or adjusted, the one or ore processing components 110 can capture an image or record a video according to these parameters.

Figure 9:
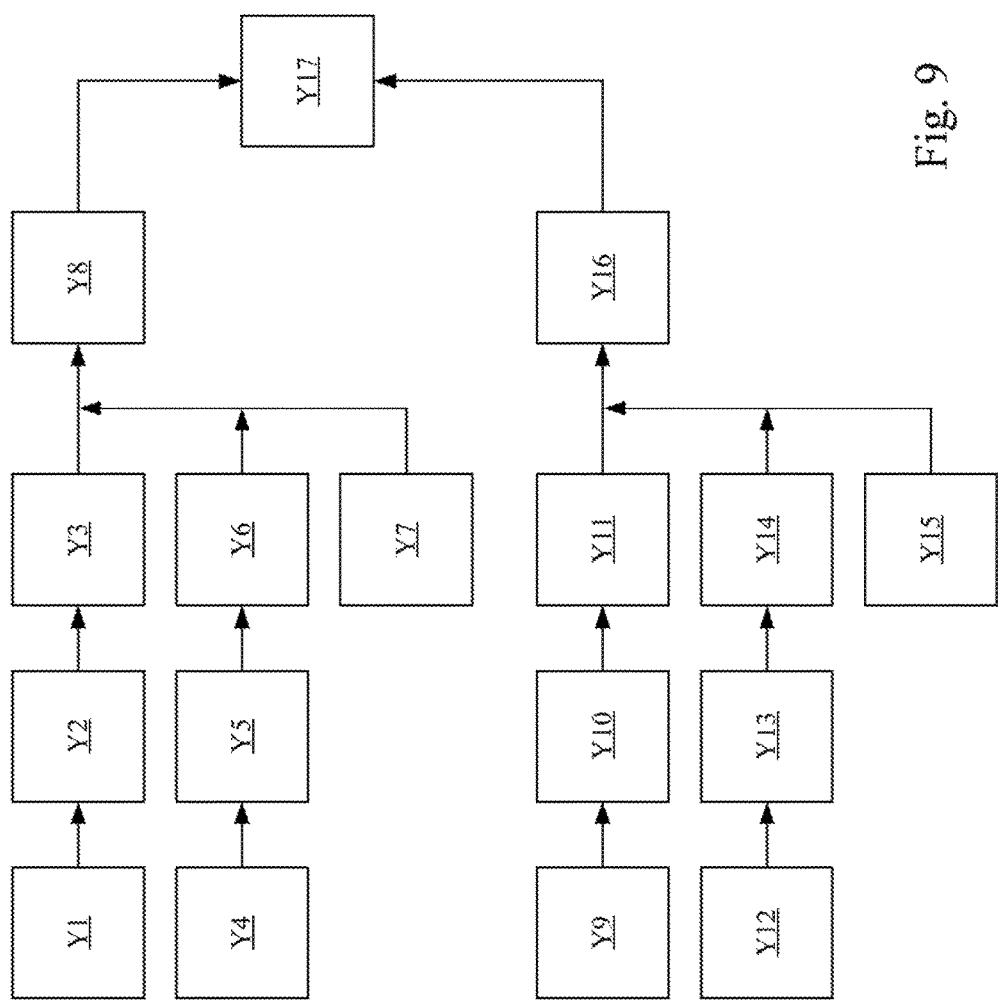
FIG. 9 shows an illustrative example in accordance with another embodiment of the present disclosure.

Another illustrative example is described with reference to FIG. 9, but the present disclosure is not limited to the example below.

In operation Y1, the sensors 102 detect an angular velocity of the camera device 100 and accordingly generate an angular velocity signal.

In operation Y2, the one or more processing components 110 perform a static offset cancellation for the angular velocity signal. In one embodiment, this operation can be selectively omitted.

In operation Y3, the one or more processing components 110 perform a dynamic offset cancellation for the angular velocity signal. In one embodiment, the dynamic offset cancellation can be performed by using a high-pass filter with a first frequency. In one embodiment, thermal noises of the angular velocity signal can be filtered out in this operation.

In operation Y4, the sensors 102 detect an acceleration of the camera device 100 and accordingly generate an acceleration signal.

In operation Y5, the one or more processing components 110 perform a static offset cancellation for the acceleration signal. In one embodiment, this operation can be selectively omitted.

In operation Y6, the one or more processing components 110 perform a dynamic offset cancellation for the acceleration signal. In one embodiment, the dynamic offset cancellation can be performed by using a high-pass filter with the first frequency. In one embodiment, thermal noises of the acceleration signal can be filtered out in this operation.

In operation Y7, the one or more processing components 110 acquire an image distance of the camera 130. Details of this operation can be ascertained with reference to the paragraphs described above, and a description in this regard will not be repeated herein.

In operation Y8, the one or more processing components 110 calculate a first target compensation value of the OIS compensation according to the filtered angular velocity signal corresponding to the first frequency, the filtered acceleration signal corresponding to the first frequency, and the image distance.

In operation Y9, the sensors 102 detect the angular velocity of the camera device 100 and accordingly generate the angular velocity signal. In one embodiment, this operation is identical to operation Y1 and can be selectively omitted.

In operation Y10, the one or more processing components 110 perform a static offset cancellation for the angular velocity signal. In one embodiment, this operation is identical to operation Y2 and can be selectively omitted.

In operation Y11, the one processing components 110 perform a dynamic offset cancellation for the angular velocity signal. In one embodiment, the dynamic offset cancellation can be performed by using a high-pass filter with a second frequency. In one embodiment, thermal noises of the angular velocity signal can be filtered out in this operation. In one embodiment, the second frequency is lower than the first frequency.

In operation Y12, the sensors 102 detect the acceleration of the camera device 100 and accordingly generate the acceleration signal. In one embodiment, this operation is identical to operation Y4 and can be selectively omitted.

In operation Y13, the one or more processing components 110 perform a static offset cancellation for the acceleration signal. In one embodiment, this operation is identical to operation Y5 and can be selectively omitted.

In operation Y14, the one or more processing components 110 perform a dynamic offset cancellation for the acceleration signal. In one embodiment, the dynamic offset cancellation can be performed by using a high-pass filter with the second frequency. In one embodiment, thermal noises of the acceleration signal can be filtered out in this operation.

In operation Y15, the one or more processing components 110 acquire an image distance of the camera 130. In one embodiment, this operation is identical to operation Y7 and can be selectively omitted.

In operation Y16, the one or more processing components 110 calculate a second target compensation value of the OIS compensation according to the filtered angular velocity signal corresponding to the second frequency, the filtered acceleration signal corresponding to the second frequency, and the image distance.

In operation Y17, the one or more processing components 110 determine the accuracy of the OIS compensation according to the first target compensation value of the OIS compensation and the second target compensation value of the OIS compensation. Details in this regard can be ascertained with reference to the paragraphs above, and a description in this regard will not be repeated herein.

Through the operations of one embodiment described above, the image or the video can be captured or recorded corresponding to the accuracy of the OIS compensation, so that the quality of the image or the video can be increased.

It should be noted that, in some embodiments, the operating methods (e.g., the operating methods 200, 300) described above may be implemented as a computer program. When the computer program is executed by a computer, an electronic device, or the one or more processing components 110 in FIG. 1, this executing device performs the operating methods. The computer program can be stored in a non-transitory computer readable medium such as a ROM (read-only memory), a flash memory, a floppy disk, a hard disk, an optical disc, a flash drive, a tape, a database accessible from a network, or any storage medium with the same functionality that can be contemplated by persons of ordinary skill in the art to which this invention pertains.

In addition, it should be noted that in the operations in the flowcharts illustrated in FIGS. 2-5 and 7-9, no particular sequence is required unless otherwise specified. Moreover, the operations described above also may be performed simultaneously or the execution times thereof may at least partially overlap.

Furthermore, operations in the flowcharts illustrated in FIGS. 2-5 and 7-9 may be added to, replaced, and/or eliminated as appropriate, in accordance with various embodiments of the present disclosure.

Although the present invention has been described in considerable detail with reference to certain embodiments thereof, other embodiments are possible. Therefore, the scope of the appended claims should not be limited to the description of the embodiments contained herein.

What is claimed is:

1. A method applied to a camera device comprising:
   receiving one or all of an angular velocity signal and an acceleration signal;
   selecting one of predetermined motion modes according to the one or all of the angular velocity signal and the acceleration signal;
   configuring one or more of an exposure time of a camera, an auto white balance (AWB) configuration of the camera, and an auto exposure (AE) configuration of the camera according to the selected motion mode;
   configuring an auto focus (AF) configuration of the camera, wherein if magnitudes of one or more of vectors in the angular velocity signal or the acceleration signal are lower than a predetermined threshold, an AF speed of the AF configuration is configured to be a fast value, and if the magnitudes of the one or more of the vectors in the angular velocity signal or the acceleration signal are greater than the predetermined threshold, the AF speed is configured to be a medium value; and
   capturing an image or recording a video according to the one or more of the exposure time of the camera, the AF configuration of the camera, the AWB configuration of the camera, and the AE configuration of the camera;
   wherein the predetermined motion modes comprise a walk mode and a rotate mode, a first AF speed is determined according to the angular velocity signal or the acceleration signal of the walk mode and a second AF speed is determined according to the angular velocity signal or the acceleration signal of the rotate mode, and the first AF speed is different from the second AF speed.

2. The method as claim in claim 1, wherein the operation of selecting one of the predetermined motion modes according to the one or all of the angular velocity signal and the acceleration signal comprises:
   acquiring an image distance of the camera;
   calculating an image shake magnitude according to the image distance and the one or all of the angular velocity signal and the acceleration signal; and
   selecting one of the predetermined motion modes according to the image shake magnitude.

3. The method as claim in claim 1, wherein the operation of selecting one of the predetermined motion modes according to the one or all of the angular velocity signal and the acceleration signal comprises:
   determining a way of a shaking of the camera device according to the one or all of the angular velocity signal and the acceleration signal; and
   selecting one of the predetermined motion modes according to the way of the shaking of the camera device.

4. The method as claim in claim 1 further comprising:
   configuring one or more of the exposure time of the camera and a gain of the camera according to an accuracy of an optical image stabilization (OIS) compensation.

5. The method as claim in claim 4, wherein the operation of configuring the one or more of the exposure time of the camera and the gain of the camera comprises:
   calculating a target compensation value of the OIS compensation according to the one or all of the angular velocity signal and the acceleration signal;
   acquiring an actual compensation value of the OIS compensation;
   determining the accuracy of the OIS compensation according to the target compensation value of the OIS compensation and the actual compensation value of the OIS compensation; and
   configuring the one or more of the exposure time of the camera and the gain of the camera according to the accuracy of the OIS compensation.

6. The method as claim in claim 4, wherein the operation of configuring the one or more of the exposure time of the camera and the gain of the camera comprises:
   high-pass filtering the one or all of the angular velocity signal and the acceleration signal with a first cutoff frequency to generate a first filtered signal;
   calculating a first target compensation value of the OIS compensation according to the first filtered signal;
   high-pass filtering the one or all of the angular velocity signal and the acceleration signal with a second cutoff frequency to generate a second filtered signal, wherein the second cutoff frequency is higher than the first cutoff frequency;
   calculating a second target compensation value of the OIS compensation according to the second filtered signal;
   determining the accuracy of the OIS compensation according to the first target compensation value of the OIS compensation and the second target compensation value of the OIS compensation; and
   configuring the one or more of the exposure time of the camera and the gain of the camera according to the accuracy of the OIS compensation.

7. The method as claim in claim 1 further comprising:
   adjusting a degree of a decrement of an alignment in an OIS compensation according to the selected motion mode.

8. A camera device comprising:
   a camera;
   one or more processing components electrically connected to the camera;
   a memory electrically connected to the one or more processing components; and
   one or more programs, wherein the one or more programs are stored in the memory and configured to be executed by the one or more processing components, the one or more programs comprising instructions for:
   receiving one or all of an angular velocity signal and an acceleration signal;
   selecting one of predetermined motion modes according to the one or all of the angular velocity signal and the acceleration signal;
   configuring one or more of an exposure time of the camera, an auto white balance (AWB) configuration of the camera, and an auto exposure (AE) configuration of the camera according to the selected motion mode;
   configuring an AF configuration of the camera, wherein if magnitudes of one or more of vectors in the angular velocity signal or the acceleration signal are lower than a predetermined threshold, an AF speed of the AF configuration is configured to be a fast value, and if the magnitudes of the one or more of the vectors in the angular velocity signal or the acceleration signal are greater than the predetermined threshold, the AF speed is configured to be a medium value; and capturing an image or recording a video according to the one or more of the exposure time of the camera, the AF configuration of the camera, the AWB configuration of the camera, and the AE configuration of the camera;

wherein the predetermined motion modes comprise a walk mode and a rotate mode, a first AF speed is determined according to the angular velocity signal or the acceleration signal of the walk mode and a second AF speed is determined according to the angular velocity signal or the acceleration signal of the rotate mode, and the first AF speed is different from the second AF speed.

9. The camera device as claimed in claim 8, wherein the one or more programs further comprise instructions for:
acquiring an image distance of the camera;
calculating an image shake magnitude according to the image distance and the one or all of the angular velocity signal and the acceleration signal; and
selecting one of the predetermined motion modes according to the image shake magnitude.

10. The camera device as claimed in claim 8, wherein the one or more programs further comprise instructions for:
determining a way of a shaking of the camera device according to the one or all of the angular velocity signal and the acceleration signal; and
selecting one of the predetermined motion modes according to the way of the shaking of the camera device.

11. The camera device as claimed in claim 8, wherein the one or more programs further comprise instructions for:
configuring one or more of the exposure time of the camera and a gain of the camera according to an accuracy of an optical image stabilization (OIS) compensation.

12. The camera device as claimed in claim 11, wherein the one or more programs further comprise instructions for:
calculating a target compensation value of the OIS compensation according to the one or all of the angular velocity signal and the acceleration signal;
acquiring an actual compensation value of the OIS compensation;
determining the accuracy of the OIS compensation according to the target compensation value of the OIS compensation and the actual compensation value of the OIS compensation; and
configuring the one or more of the exposure time of the camera and the gain of the camera according to the accuracy of the OIS compensation.

13. The camera device as claimed in claim 11, wherein the one or more programs further comprise instructions for:
high-pass filtering the one or all of the angular velocity signal and the acceleration signal with a first cutoff frequency to generate a first filtered signal;
calculating a first target compensation value of the OIS compensation according to the first filtered signal;
high-pass filtering the one or all of the angular velocity signal and the acceleration signal with a second cutoff frequency to generate a second filtered signal, wherein the second cutoff frequency is higher than the first cutoff frequency;
calculating a second target compensation value of the OIS compensation according to the second filtered signal;

determining the accuracy of the OIS compensation according to the first target compensation value of the OIS compensation and the second target compensation value of the OIS compensation; and
configuring the one or more of the exposure time of the camera and the gain of the camera according to the accuracy of the OIS compensation.

14. The camera device as claimed in claim 11, wherein the one or more programs further comprise instructions for:
configuring a degree of a decrement of an alignment in an OIS compensation according to the selected motion mode.

15. A camera device comprising:
a camera;
one or more processing components electrically connected to the camera;
a memory electrically connected to the one or more processing components; and
one or more programs, wherein the one or more programs are stored in the memory and configured to be executed by the one or more processing components, the one or more programs comprising instructions for:
receiving one or all of an angular velocity signal and an acceleration signal;
configuring an AF configuration of the camera, wherein if magnitudes of one or more of vectors in the angular velocity signal or the acceleration signal are lower than a predetermined threshold, an AF speed of the AF configuration is configured to be a fast value, and if the magnitudes of the one or more of the vectors in the angular velocity signal or the acceleration signal are greater than the predetermined threshold, the AF speed is configured to be a medium value;
configuring an exposure time of a camera and a gain of the camera according to an accuracy of an optical image stabilization (OIS) compensation, or only configuring the gain of the camera according to the accuracy of the OIS compensation; and
capturing an image or recording a video according to the exposure time, the AF configuration, and the gain of the camera.

16. The camera device as claimed in claim 15, wherein the one or more programs further comprise instructions for:
calculating a target compensation value of the OIS compensation according to the one or all of the angular velocity signal and the acceleration signal;
acquiring an actual compensation value of the OIS compensation;
determining the accuracy of the OIS compensation according to the target compensation value of the OIS compensation and the actual compensation value of the OIS compensation; and
configuring one or more of the exposure time of the camera and the gain of the camera according to the accuracy of the OIS compensation.

17. The camera device as claimed in claim 15, wherein the one or more programs further comprise instructions for:
high-pass filtering the one or all of the angular velocity signal and the acceleration signal with a first cutoff frequency to generate a first filtered signal;
calculating a first target compensation value of the OIS compensation according to the first filtered signal;
high-pass filtering the one or all of the angular velocity signal and the acceleration signal with a second cutoff frequency to generate a second filtered signal, wherein the second cutoff frequency is higher than the first cutoff frequency;

calculating a second target compensation value of the OIS compensation according to the second filtered signal;

determining the accuracy of the OIS compensation according to the first target compensation value of the OIS compensation and the second target compensation value of the OIS compensation; and configuring one or more of the exposure time of the camera and the gain of the camera according to the accuracy of the OIS compensation.

18. The camera device as claimed in claim 15, wherein the one or more programs further comprise instructions for:

selecting one of predetermined motion modes according to the one or all of the angular velocity signal and the acceleration signal; and configuring one or more of the exposure time of the camera, an auto focus (AF) configuration of the camera, an auto white balance (AWB) configuration of the camera, and an auto exposure (AE) configuration of the camera according to the selected motion mode.

19. The camera device as claimed in claim 15, wherein the one or more programs further comprise instructions for:

acquiring an image distance of the camera;

calculating an image shake magnitude according to the image distance and the one or all of the angular velocity signal and the acceleration signal; and selecting one of the predetermined motion modes according to the image shake magnitude.

20. The camera device as claimed in claim 15, wherein the one or more programs further comprises instructions for:

determining a way of a shaking of the camera device according to the one or all of the angular velocity signal and the acceleration signal; and selecting one of the predetermined motion modes according to the way of the shaking of the camera device.

* * * * *